Sept. 27, 1938.  C. F. OSGOOD  2,131,189
MINING APPARATUS
Filed July 30, 1935  9 Sheets-Sheet 4

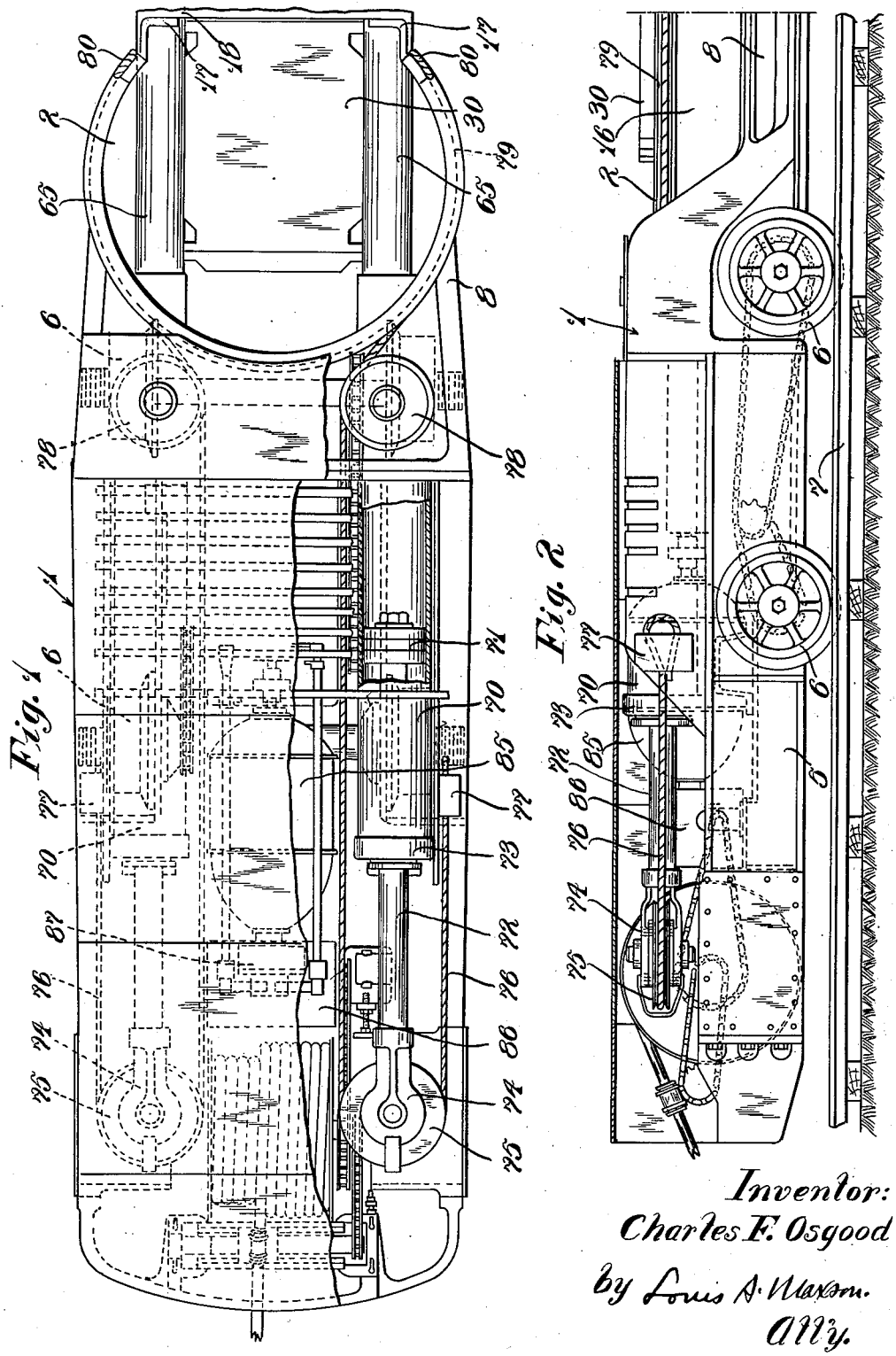

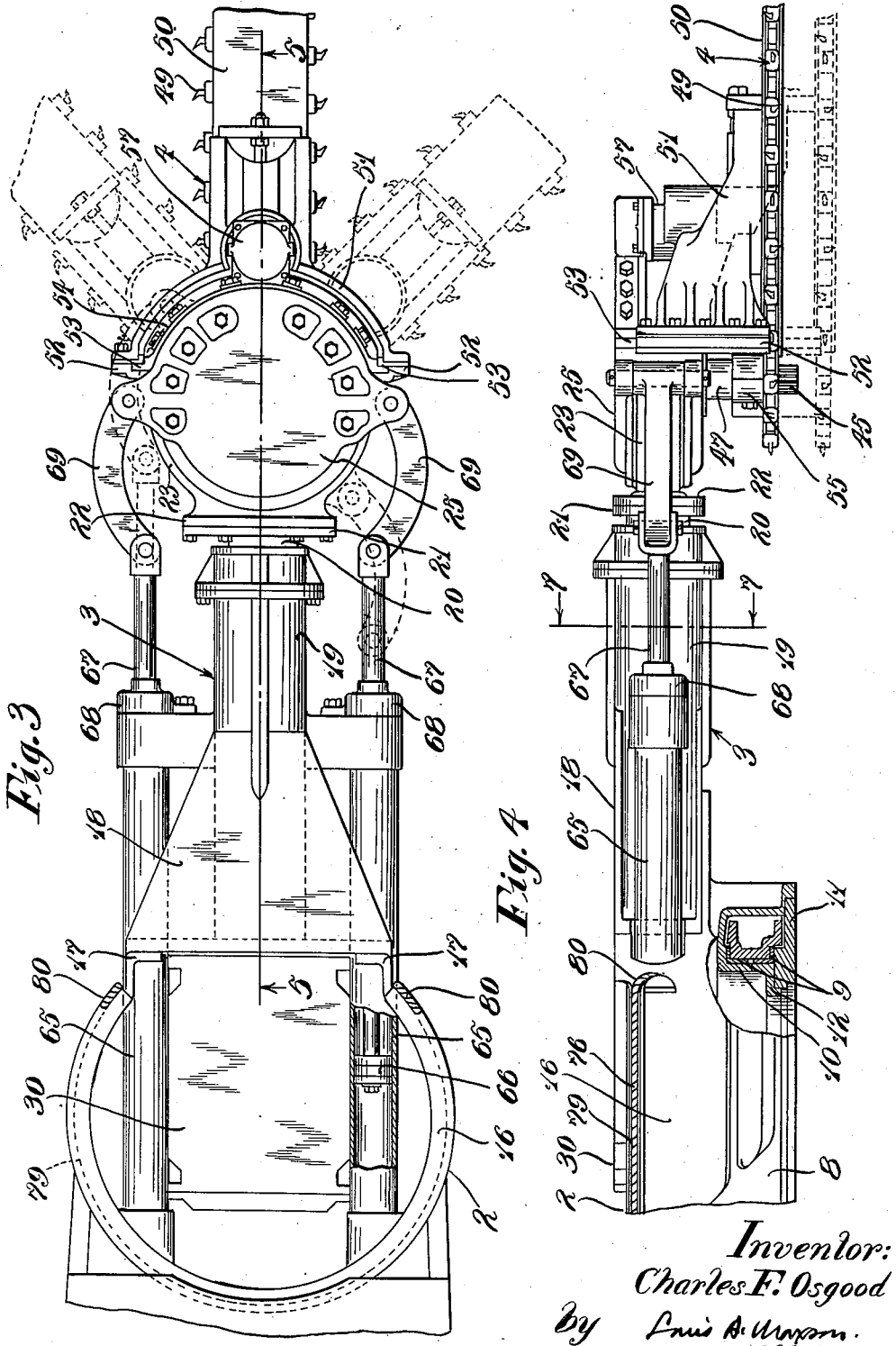

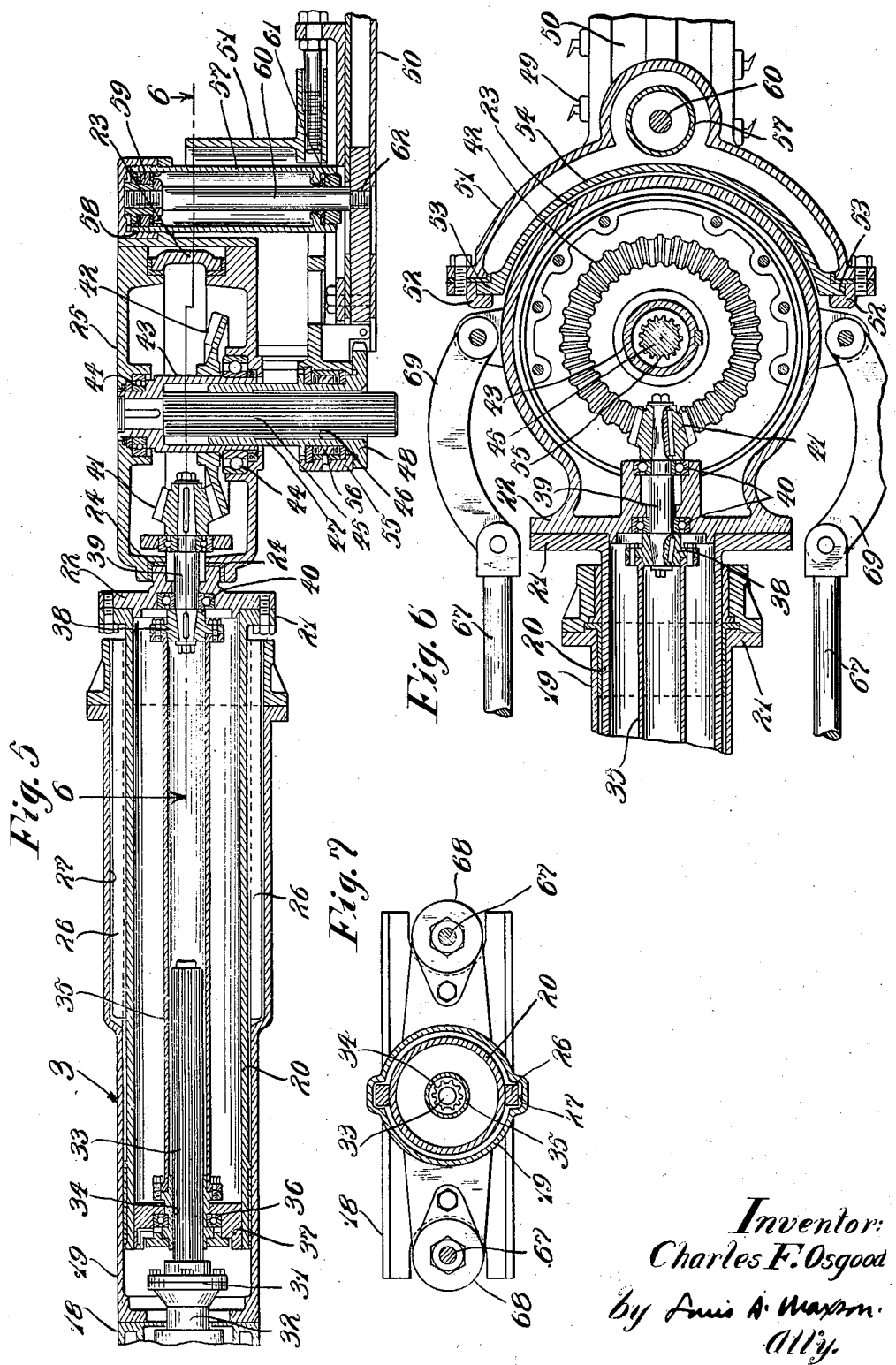

Inventor:
Charles F. Osgood
by *Louis A. Maxson*
Atty.

Sept. 27, 1938. C. F. OSGOOD 2,131,189
MINING APPARATUS
Filed July 30, 1935 9 Sheets-Sheet 5

Inventor:
Charles F. Osgood
by [signature]
Atty.

Sept. 27, 1938. C. F. OSGOOD 2,131,189
MINING APPARATUS
Filed July 30, 1935 9 Sheets-Sheet 6
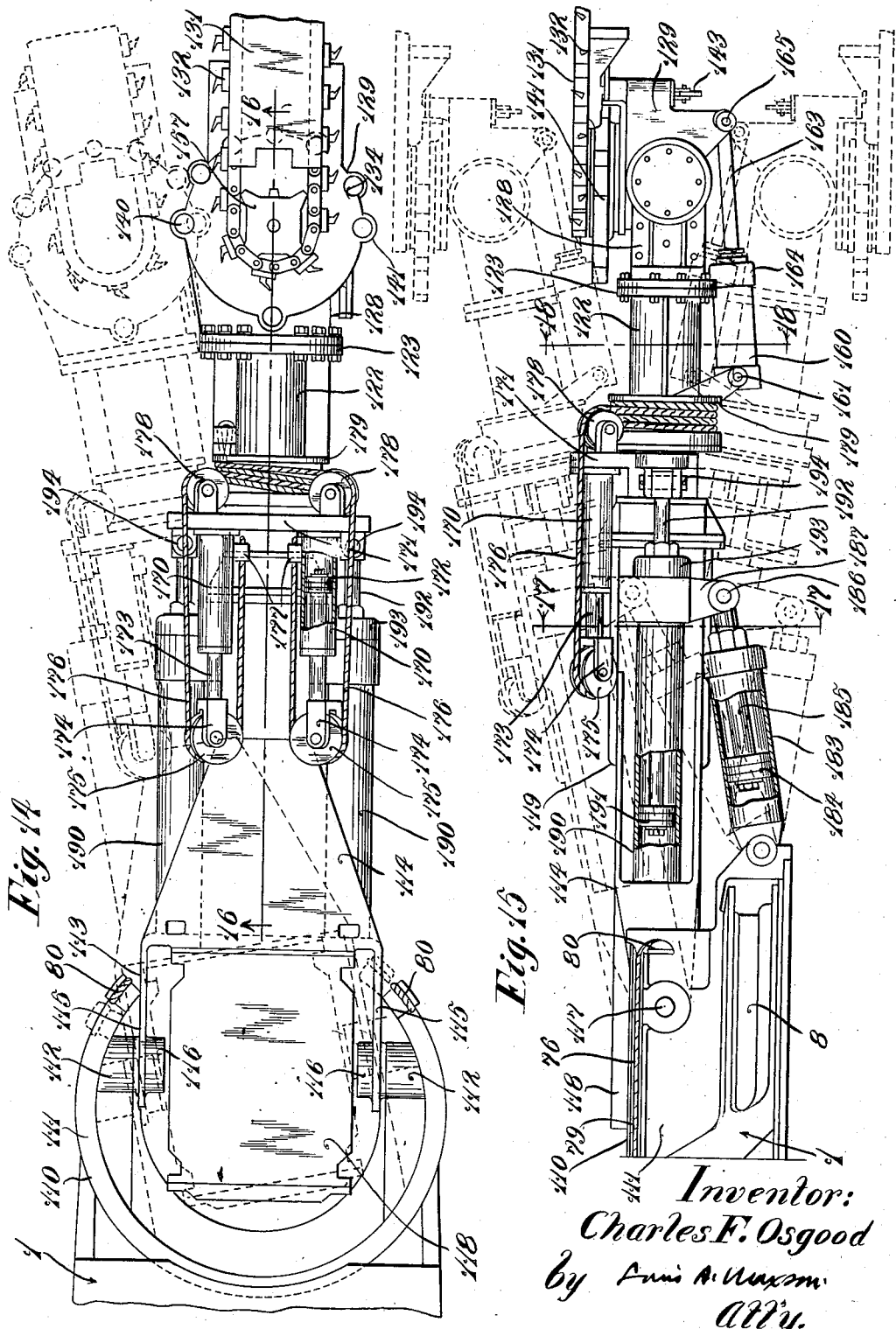
Inventor:
Charles F. Osgood
by [signature]
Att'y.

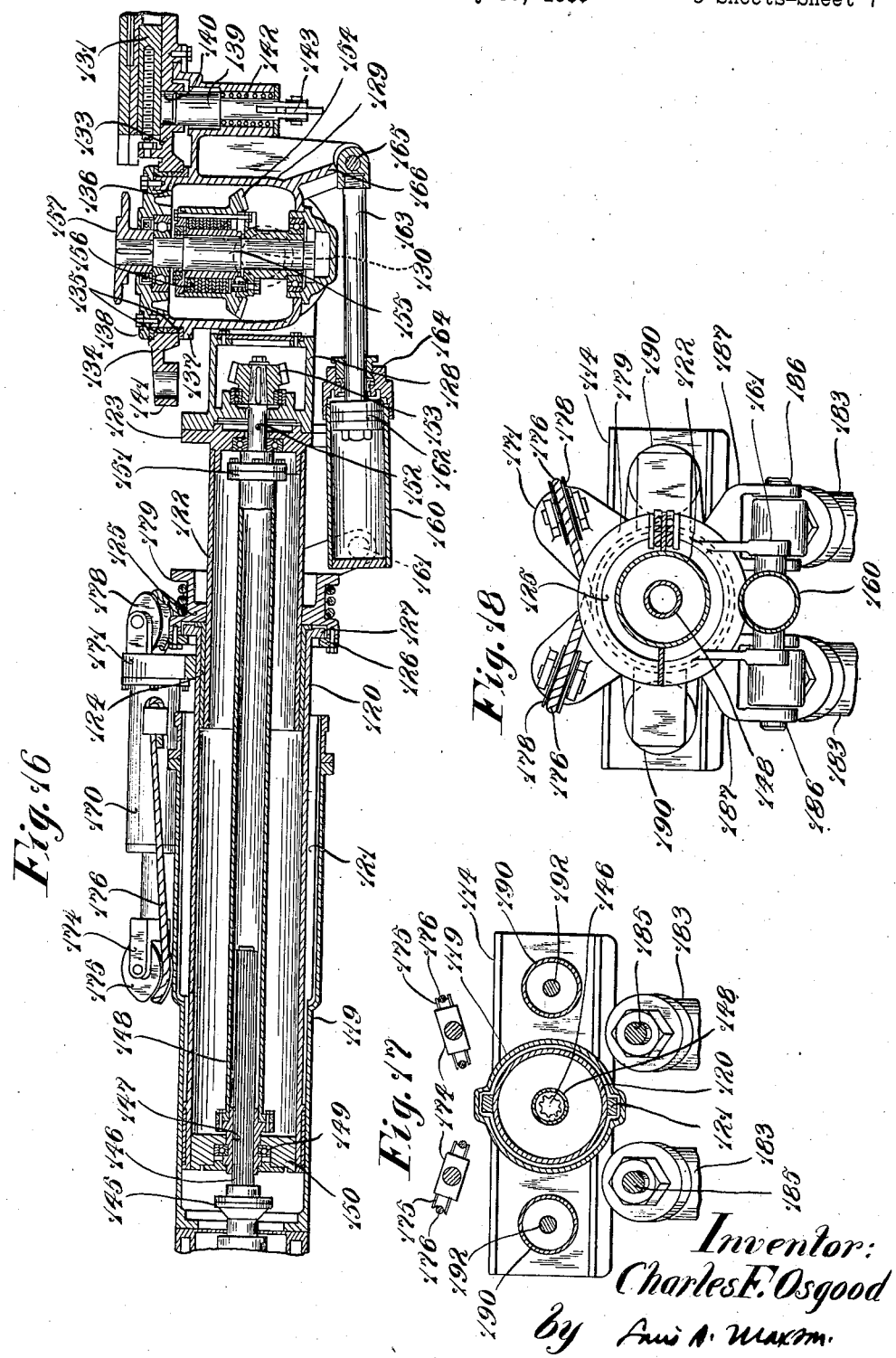

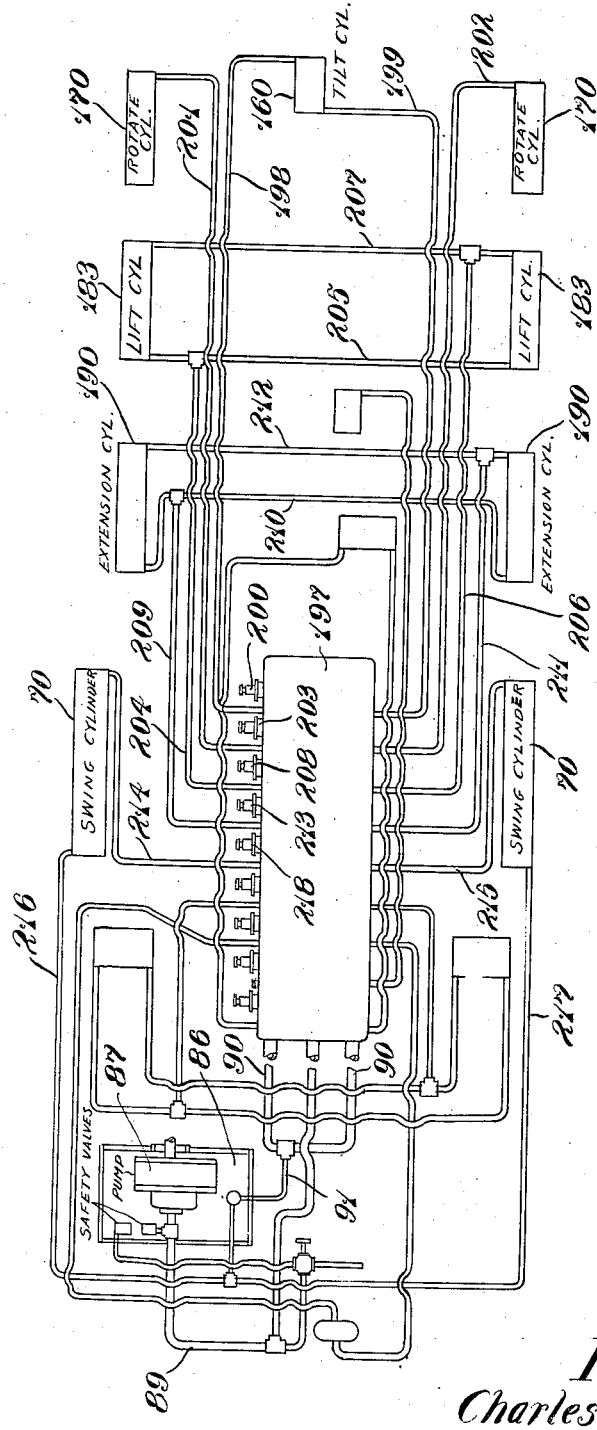

Sept. 27, 1938.   C. F. OSGOOD   2,131,189
MINING APPARATUS
Filed July 30, 1935    9 Sheets-Sheet 9
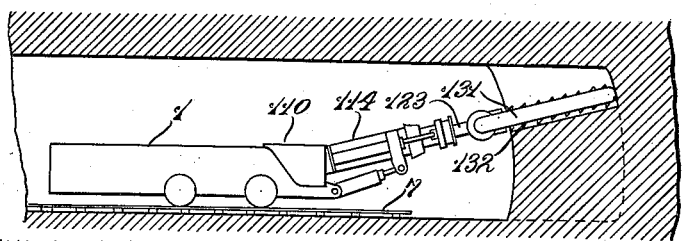
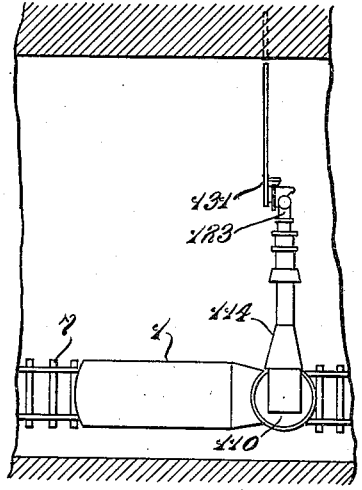
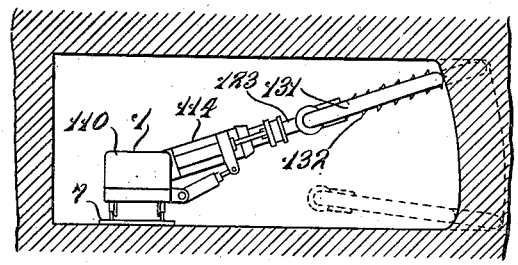
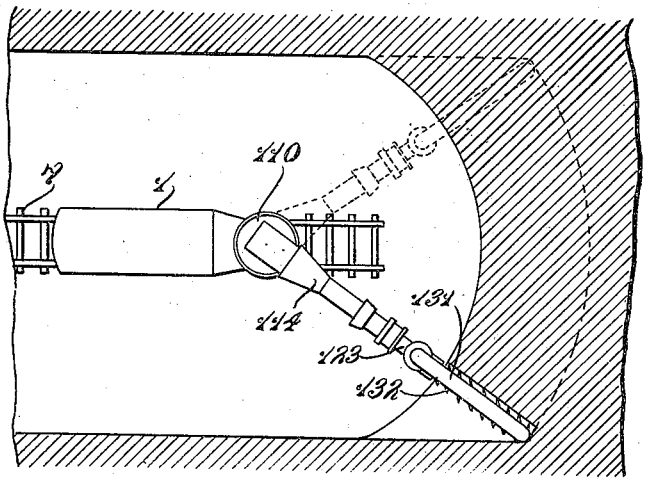
Inventor:
Charles F. Osgood Patented Sept. 27, 1938

2,131,189

UNITED STATES PATENT OFFICE 2,131,189

MINING APPARATUS

Charles F. Osgood, Claremont, N. H., assignor to Sullivan Machinery Company, a corporation of Massachusetts Application July 30, 1935, Serial No. 33,875

14 Claims. (Cl. 262—28)

This invention relates to mining apparatus, and more particularly to improvements in the adjustable supporting structure for the kerf cutting mechanism of an apparatus for mining coal.

An object of this invention is to provide an improved mining apparatus having improved adjustable kerf cutting mechanism. Another object of this invention is to provide an improved adjustable supporting structure for the kerf cutter whereby the kerf cutter may be adjusted into various cutting planes. Yet another object is to provide an improved adjustable supporting structure of the extensible type whereby the kerf cutter may be supported at varying distances with respect to its portable base. A further object of this invention is to provide an improved pivotal mounting structure for the kerf cutter and improved means for swinging the mounting structure. Yet another object of this invention is to provide an improved adjustable kerf cutter supporting structure of the swinging boom type, the boom being of extensible construction whereby the kerf cutter may be fed rectilinearly with respect to the base while the latter remains stationary, the improved supporting structure being adjustable to position the kerf cutter to cut horizontal and shear kerfs in the coal face and shear kerfs in the ribs of the entry at right angles to the trackway. A further object of this invention is to provide an improved adjustable supporting structure for the kerf cutter whereby the kerf cutter may be sumped beneath the coal, swung arcuately across the face and thereafter withdrawn from beneath the coal while its wheeled truck frame remains stationary as regards movement along the mine trackway. A still further object is to provide an improved adjustable kerf cutter supporting structure whereby kerfs may be cut at any desired location at the coal face and at either rib. These and other objects and advantages of the invention will, however, hereinafter more fully appear.

In the accompanying drawings there are shown for purposes of illustration two forms which the invention may assume in practice.

In these drawings,—

Figs. 1 and 3, taken together, show in plan one illustrative embodiment of the improved mining apparatus, parts being shown in horizontal section to illustrate structural details.

Figs. 2 and 4, taken together, show in side elevation the improved mining apparatus shown in Figs. 1 and 3, portions of the casing being broken away to show the interior construction.

Fig. 5 is a view in longitudinal section taken substantially on line 5—5 of Fig. 3.

Fig. 7 is a cross sectional view taken substantially on line 7—7 of Fig. 4.

Fig. 8 is a diagrammatic view showing the hydraulic fluid system and associated control means.

Figs. 14 and 15 are views similar to Figs. 3 and 4, respectively, showing a modified form of the invention.

Fig. 16 is a view in longitudinal section taken substantially on line 16—16 of Fig. 14.

Fig. 17 is a cross sectional view taken substantially on line 17—17 of Fig. 15.

Fig. 18 is a cross sectional view taken substantially on line 18—18 of Fig. 15.

Fig. 19 is a diagrammatic view showing the hydraulic fluid system and associated control means.

Fig. 20 is a diagrammatic side elevational view of a mine entry showing the mining apparatus making a vertical shear cut in the coal seam.

Fig. 21 is a diagrammatic plan view of a mine entry showing the mining apparatus making a vertical shear cut in the rib.

Fig. 22 is a diagrammatic cross sectional view through a mine entry showing the mining apparatus making a vertical shear cut in the rib.

Fig. 23 is a diagrammatic plan view of a mine entry showing the mining apparatus in a position to make a horizontal arcwall cut in the coal seam.

Figure 6:
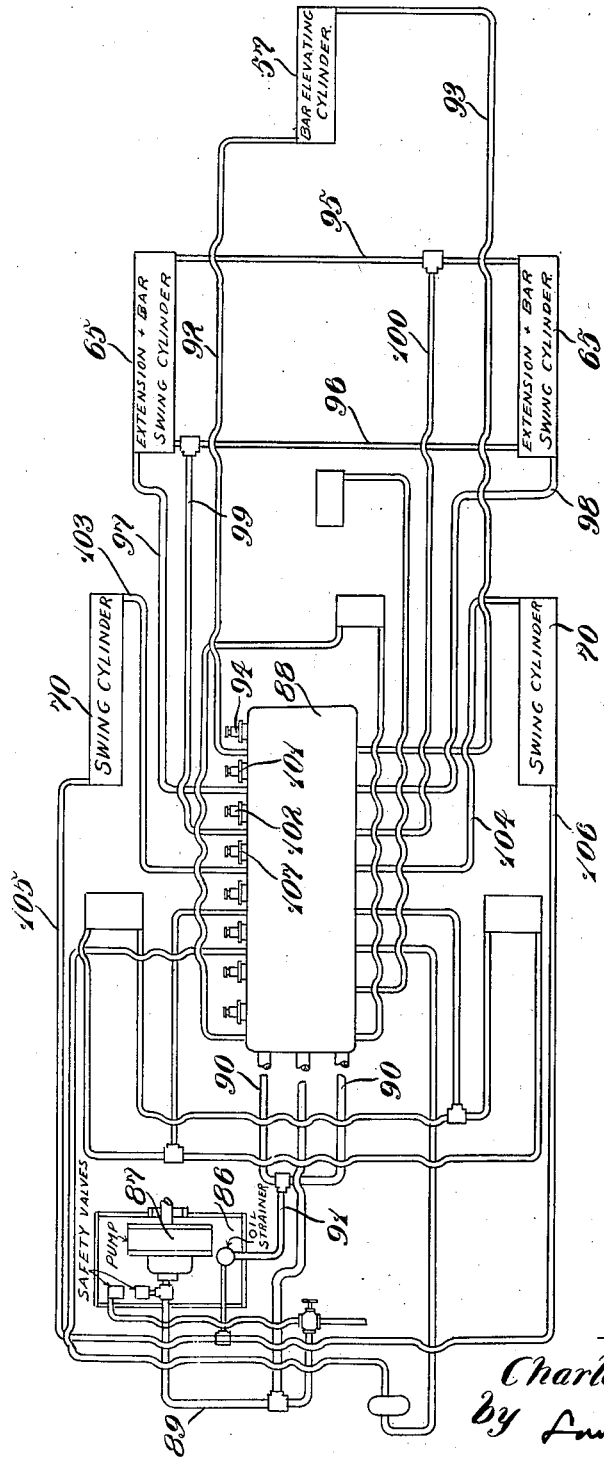
Fig. 6 is a horizontal sectional view taken substantially on line 6—6 of Fig. 5.
Figure 9:
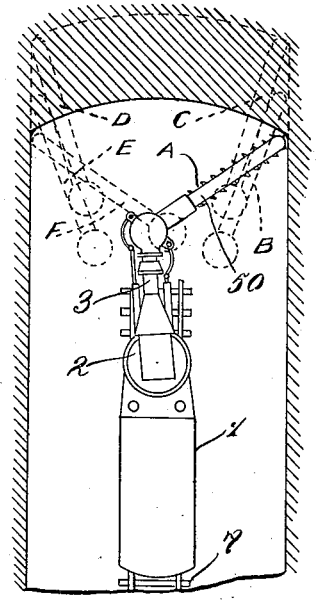
Fig. 9 is a diagrammatic plan view of a mine entry showing the mining apparatus making a horizontal cut in the coal seam by means of the extensible arm structure while the supporting truck remains stationary as regards movement along the mine trackway.

In the illustrative embodiment of the invention shown in Figs. 1 to 13, inclusive, there is shown a coal mining apparatus of the wheel mounted, track supported and guided type generally comprising a portable base 1, a horizontal turntable 2, and an extensible supporting structure generally designated 3 for a kerf cutting mechanism 4. The portable base 1 is herein in the form of a truck frame 5 of an extremely low, compact design supported on wheels 6 adapted to run along a mine trackway 7 laid on the mine floor. This truck frame has a forwardly projecting horizontal frame portion 8 supported in a relatively low position below the top of the truck and in advance of the front truck wheel axle, and on which the turntable 2 is mounted for rotation about a vertical axis with respect to the truck frame, the turntable axis being located on the truck frame a substantial distance in advance of the front truck wheels, thereby enabling the turntable structure to be mounted on the truck frame in an extremely low position. The annular frame 8 of the truck frame is in the form of a bearing annulus and supports bearing sleeves 9 on which the cylindrical bearing portion 10 of the turntable frame is rotatably mounted, the turntable being retained in position within its bearing mounting by an annular retaining plate 11 firmly secured to an annular flange 12 formed integral with the bottom of the cylindrical bearing portion 10 on the turntable. Formed integral with the cylindrical bearing portion 10 and extending upwardly therefrom is a segmental open-center frame or arcuate flange 16, to which is rigidly secured at 17 a horizontal frame 18. This horizontal frame 18 overhangs the forward end of the truck frame and has secured at its forward end a tubular frame 19 in which is telescopically arranged an extensible frame 20 likewise of tubular form. The telescopic tubular frames 19 and 20 and the rigid frame 18 form an extensible arm structure for the kerf cutting mechanism as will later be described. Formed integral with the extensible tubular frame 20 is an annular flange 21 having secured thereto a frame 22 having an annular bearing portion 23, while rotatably mounted on bearing sleeves 24 supported by the bearing annulus 23 to turn about an axis parallel with the turntable axis is a rotatable support 25 for the kerf cutting mechanism. As shown in Figs. 5 and 7, the extensible tubular frame 20 has integral splines 26 slidingly engaging longitudinal splineways 27 formed in the tubular frame 19, and these splined connections permit axial movement of the extension frame 20 while preventing relative rotation between the frames 19 and 20.

Now referring to the kerf cutting mechanism 4, and more particularly to the kerf cutter driving mechanism, it will be noted that rigidly secured to the horizontal frame 18 and the turntable and arranged in the open center of the turntable frame, is a horizontal motor 30 having its power shaft extending longitudinally of the extensible arm structure. Secured, as by a coupling 31, to the forward end of the motor power shaft 32 is a shaft 33 having telescopic splined connection at 34 to a tubular shaft 35. The tubular shaft 35 is journaled at its rear end in a bearing 36 supported by a head 37 secured within the tubular frame 20, and is secured at its forward end by a coupling 38 to an alined shaft 39 journaled within bearings 40 supported within the frame 22. Keyed to the forward end of the shaft 39 is a bevel pinion 41 meshing with a large bevel gear 42 keyed to a shaft 43 journaled within bearings 44 supported within the rotatable support 25. The shaft 43 is keyed to the upper end of a shaft 45 splined at 46 to a tubular shaft 47, the shafts 45 and 47 being telescopically arranged and forming a telescopic torque shaft for driving a chain sprocket 48. This chain sprocket engages and drives an endless cutter chain 49 mounted for circulation about the margin of an elongated plane, horizontal cutter bar 50. This cutter bar is supported by a hanger 51 having vertical guideways 52 in which are slidably guided vertical guides 53 formed integral with a frame 54 secured to the rotatable support 25. The bar hanger frame 51 has an integral bearing annulus 55 in which is supported a bearing 56 for journaling the tubular shaft 47 of the telescopic torque shaft. The means for adjusting the hanger frame 51 vertically with respect to the rotatable support 25 for varying the elevation of the cutter bar comprises a double acting hydraulic cylinder 57 secured at 58 within the rotatable support 25 and containing a reciprocable piston 59 having a piston rod 60 extending downwardly through the packed lower head 61 of the cylinder. The lower end of the piston rod 60 is threadedly secured at 62 to the cutter bar 50. It will thus be seen that when hydraulic pressure is supplied to the cylinder 57, the piston 59 may be moved either upwardly or downwardly to vary the elevation of the cutter bar with respect to the rotatable support 25, the telescopic torque shaft maintaining the chain and sprocket 48 always in driving relation with the motor irrespective of the elevation of the cutter bar.

The means for extending and retracting the tubular extension frame 20 with respect to the tubular frame 19, and for swinging the cutter bar about its pivot relative to the extensible arm structure, comprises a pair of double acting hydraulic cylinders 65, 65 rigidly secured in parallel relation within the turntable frame in the manner shown in Fig. 3 and containing reciprocable pistons 66 having piston rods 67 extending forwardly through the packed front heads 68 of the cylinders. The forward ends of the piston rods are pivotally connected to links 69 in turn pivotally connected to the rotatable cutter bar support 25. When hydraulic pressure is supplied to the hydraulic cylinders 65, the pistons 66 may be reciprocated to move the tubular extension frame 20 either inwardly or outwardly with respect to the frame 19, thereby to vary the distance of the cutter bar pivot with respect to the turntable axis so that the cutter bar may swing about the turntable axis in arcs struck along radii of different lengths. When hydraulic pressure is supplied to one or the other of the cylinders 65, one or the other of the pistons may be actuated to swing the cutter bar about the axis of the rotatable support 25 relative to the extensible supporting structure. It is accordingly evident that the hydraulic cylinders and pistons 65, 66 may be employed both to extend the arm structure and to swing the cutter bar about its pivot relative to the arm structure. By trapping the liquid within the cylinders 57 and 65, the cutter bar may be locked in its different positions of adjustment in an obvious manner.

Hydraulic means is provided for rotating the turntable about its axis relative to the truck frame comprising, as shown in Figs. 1 and 2, a pair of single acting hydraulic cylinders 70, 70 secured within the truck frame and arranged in longitudinal parallel relation at opposite sides of the truck frame. These cylinders each contain a piston 71 having a rearwardly projecting piston rod 72 extending from the packed rear head 73 of the cylinder. Secured to the rear end of each of the piston rods 72 is a bracket 74 on which is journaled a pulley 75. Cables 76, 76 each have an end fastened at 77 to the truck frame and pass around the pulleys 75, portions of the cables extending from the pulleys 75 forwardly through openings in the truck frame around horizontal pulleys 78, the opposite ends portions of the cables extending from the pulleys 78 around a segmental guiding groove 79 formed about the rim of the flanged portion of the turntable frame, and these cables are secured at their opposite ends at 80 to the turntable frame. It will thus be seen that when hydraulic pressure is supplied to one or the other of the cylinders 70, the cables may be operated to swing the turntable 2 in one direction or the other about its axis with respect to the truck frame. By trapping the liquid within the cylinders 70, the turntable may be locked against rotation.

The mechanism for driving the truck wheels to propel the apparatus along the mine trackway may be generally similar to that disclosed in a copending application of one Joseph F. Joy, Serial No. 20,826, filed May 10, 1935, and as the detail structure of this truck propelling mechanism does not enter into this invention, description and illustration of the same are considered unnecessary other than to state that the truck wheels may be driven to propel the apparatus in either of opposite directions along the mine trackway at a low cutting speed or a relatively high transport speed. As described in the above mentioned copending application, the truck driving mechanism is driven by a motor 85 supported on the rearward portion of the truck frame at the rear of the turntable, and this motor also drives the pump for supplying hydraulic pressure to the various hydraulic cylinders in a manner to be later described.

Now referring to the hydraulic fluid system and associated control means, it will be noted that driven by the motor 85 and arranged in a tank 86 is a gear pump 87. The tank is adapted to contain a liquid, preferably oil, and the pump is adapted to supply hydraulic pressure to the various hydraulically operated devices of the apparatus. Arranged within the truck frame is a horizontal valve box 88 of a design similar to that described in the above mentioned copending application, and this valve box has formed therein a series of horizontal valve bores, each containing a balanced type slide valve for controlling the flow of hydraulic pressure to the various hydraulic devices. The gear pump 87 is of the variable displacement triple rotor type of a conventional design and is provided with usual variable displacement control valves. The discharge side of the pump 87 is connected through a conduit 89 to the supply passage of the valve box 88, while the discharge passages of the valve box are connected through branched conduits 90 to a conduit 91 leading to the tank 86. Conduits 92 and 93 connect the opposite ends of the cutter bar elevating cylinder 57 with the valve box 88, and a slide valve 94 controls the connection of these conduits with the supply and discharge passages so that hydraulic pressure may be supplied to either end of the cylinder and either end of the cylinder may be connected to discharge. The forward ends of the extension and bar swing cylinders 65 are connected together by a conduit 95, while the rear ends of these cylinders are connected together by a conduit 96 and the rear ends of the cylinders are also connected by conduits 97 and 98 to the valve box 88. A conduit 99 connects the conduit 96 with the valve box, while a conduit 100 connects the conduit 95 with the valve box. Slide valves 101 and 102 control the flow of hydraulic pressure through the conduits 97, 98, 99 and 100 to the ends of the cylinders 65, and these valves are adjustable to control the flow of liquid pressure to the cylinders simultaneously or independently. The forward ends of the turntable rotation cylinders 70 are connected by conduits 103 and 104 to the valve box, while drain conduits 105 and 106 connect the rear ends of the cylinders 70 to the tank. A slide valve 107 controls the connection of the conduits 103 and 104 with the supply and discharge passages of the valve box 88. It will thus be seen that hydraulic pressure may be supplied under the control of the slide valves 94, 101, 102 and 107, all in the manner described in the above mentioned Joy application.

Figure 10:
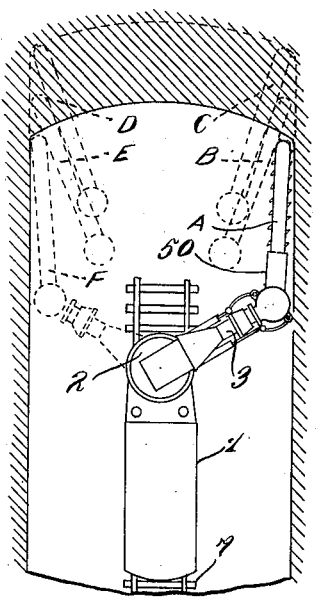
Fig. 10 is a view similar to Fig. 9 showing another method of inserting a horizontal cut in the coal seam by means of the extensible arm structure while the supporting truck remains stationary as regards movement along the mine trackway.
Figure 11:
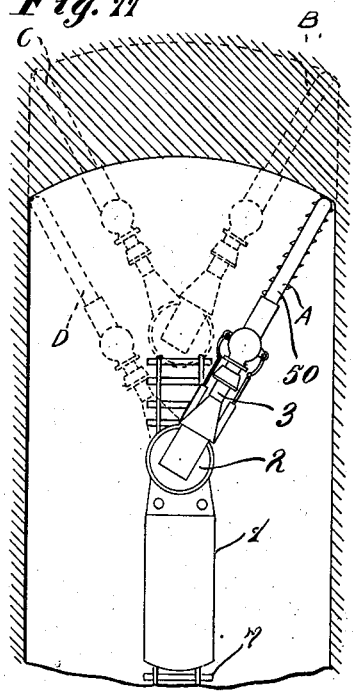
Fig. 11 is a diagrammatic plan view showing the mining apparatus making a sumping, swinging and withdrawal cut in the coal seam in accordance with the arcwall method in a narrow entry, with the extensible arm structure in retracted position.
Figure 12:
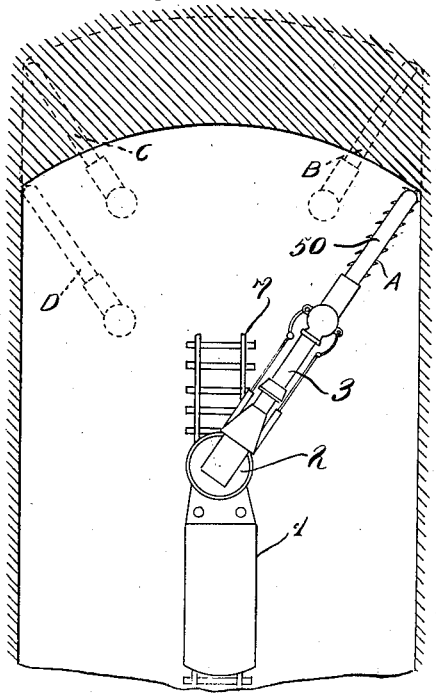
Fig. 12 is a view similar to Fig. 11 showing the extensible arm structure in extended position for cutting in accordance with the arcwall method in a wide entry.
Figure 13:
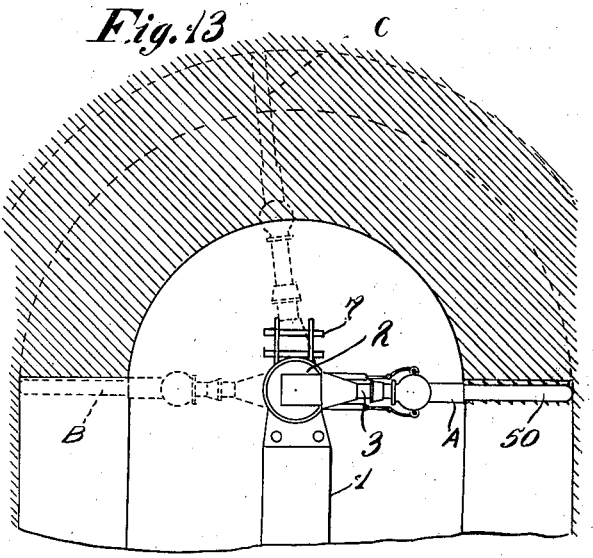
Fig. 13 is a diagrammatic plan view of a mine entry showing the mining apparatus making sweeping cuts in the coal seam with the supporting structure in retracted position, as indicated in full lines, and in extended position, as indicated in dotted lines.

The operation of the embodiment of the invention above described is as follows: The apparatus is propelled along the mine trackway through the mine entry at either high or low speeds respectively suitable for transporting and cutting as clearly described in the above mentioned copending application, Ser. No. 20,826, and when the working place is reached, the truck frame is jacked in position on the track rails by suitable hydraulic jacks engageable with the mine roof. When the apparatus is in the position shown in Fig. 9, hydraulic pressure may be supplied to one of the bar swing cylinders 65 and one of the turntable rotation cylinders 70 to swing the arm structure and cutter bar to the full line position indicated at A with the tip end of the cutter bar at the right hand rib. The motor 30 is then operated to effect rapid circulation of the cutter chain about the margin of the cutter bar. Hydraulic pressure is then supplied to both hydraulic swing cylinders 65 and one of the turntable rotation cylinders 70 under the control of the slide valves to swing the arm structure and the cutter bar about their respective pivots partially to sump the cutter bar within the coal seam until the cutter bar assumes the dotted line position indicated at B. Hydraulic pressure is then supplied to the cylinders 65 under the control of the slide valves to extend the arm structure and swing simultaneously the cutter bar to the left about its pivot to move the cutter bar to the position indicated in dotted lines at C, thereby to complete the sumping movement of the cutter bar in the coal seam. Hydraulic pressure is then trapped within the cylinders 65 to lock the cutter bar against swinging movement about its pivot relative to the arm structure. Hydraulic pressure is then supplied to one of the turntable rotation cylinders 70 to swing the arm structure about the turntable axis from the position indicated at C transversely across the coal face to the dotted line position indicated at D. Hydraulic pressure is then supplied to the cylinders 65 to retract the extension arm structure and to swing simultaneously the cutter bar to the left to move the cutter bar from the position D to the dotted line position indicated at E, thereby partially to withdraw the cutter bar from the coal seam. Hydraulic pressure is then supplied to the cylinders 65 and one of the cylinders 70 to move the arm structure and the cutter bar about their respective pivots, thereby to move the cutter bar from position E to the dotted line position indicated at F, completely to withdraw the cutter bar from the coal seam. Another method of sumping, swinging and withdrawing the cutter bar to make a horizontal cut in the coal seam while the truck frame remains stationary on the trackway is shown in Fig. 10. When the truck frame is jacked in position at the coal face, hydraulic pressure is supplied to one of the turntable rotation cylinders 70 and one of the cylinders 65 to swing the arm structure and cutter bar in opposite directions about their respective pivots to move the cutter bar to the full line position indicated at A with the cutter bar at the right hand rib. The motor 30 is then operated to effect rapid circulation of the cutter chain about the margin of the cutter bar. Hydraulic pressure is then supplied to the others of the cylinders 70 and 65 to swing the arm structure and cutter bar in opposite directions about their respective pivots to move the cutter bar into its partially sumped position indicated in dotted lines at B. Hydraulic pressure is then supplied to the cylinders 65 under the control of the slide valves to extend the arm structure and simultaneously to swing the cutter bar slightly to the left about its pivot, thereby to complete the sumping cut, the cutter bar moving from position B to the dotted line position indicated at C. Hydraulic pressure is then trapped by the slide valves in the cylinders 65 to lock the cutter bar against swinging movement about its pivot relative to the arm structure. Hydraulic pressure is then supplied to one of the turntable rotation cylinders 70 to swing the cutter bar about the turntable axis from the position C transversely across the coal face to the dotted line position indicated at D. The cylinders 65 under the control of the slide valves are then operated to retract the arm structure and simultaneously to swing the cutter bar about its pivot to move the cutter bar from position D rearwardly to the partially withdrawn position indicated in dotted lines at E. Hydraulic pressure is thereafter supplied to one of the cylinders 65 and one of the cylinders 70 under the control of the slide valves to swing the arm structure and cutter bar simultaneously in opposite directions about their respective pivots to move the cutter bar from the position E to the position indicated in dotted lines at F, thereby to withdraw completely the cutter bar from the coal seam. During operation of the apparatus in accordance with the arcwall method of cutting in a narrow entry as shown in Fig. 11, hydraulic pressure is supplied to one of the turntable rotation cylinders 70 to swing the cutter bar about the turntable axis to the full line position indicated at A with the tip end of the cutter bar at the right hand rib. Hydraulic pressure is then trapped in the cylinders 65 and 70 to lock the arm structure and cutter bar against swinging movement relative to the truck frame. The motor 30 is then operated to effect rapid circulation of the cutter chain about the margin of the cutter bar. The apparatus is then propelled bodily forwardly along the mine trackway to effect sumping of the cutter bar into the coal seam, the cutter bar moving from the position indicated at A to the dotted line position indicated at B. The truck wheel brake is then set to hold the truck frame stationary on the track rails, and hydraulic pressure is supplied to one of the turntable rotation cylinders 70 to swing the cutter bar about the turntable axis from the position indicated at B transversely across the coal face to the position indicated in dotted lines at C. The liquid is then trapped in the cylinders 70, the truck wheel brake released and the apparatus propelled bodily rearwardly along the mine trackway to move the cutter bar from the position C to the dotted line position indicated at D, thereby to withdraw the cutter bar from the coal seam. During operation of the apparatus in accordance with the arcwall method of cutting in a relatively wide entry, as shown in Fig. 12, hydraulic pressure is supplied to the extension cylinders 65 to move the extension arm structure into its fully extended position. Hydraulic pressure is then supplied to one of the turntable rotation cylinders 70 to swing the cutter bar to the full line position indicated at A with the tip end of the cutter bar at the right hand rib. The cutter bar is then sumped into the dotted line position indicated at B, swung transversely across the coal face to the dotted line position indicated at C and withdrawn from the coal to the dotted line position indicated at D, in the manner described above in regard to the arcwall cutting operation in a narrow entry. During the making of sweeping cuts in a narrow entry, the cutter bar is moved to the position indicated at A in Fig. 13 with the truck frame jacked in position on the track rails. Hydraulic pressure is then supplied to one of the turntable rotation cylinders to swing the cutter bar about the turntable axis from position A to the dotted line position indicated at B, thereby to make a swinging horizontal cut in the coal seam. When it is desired to make a sweeping cut in a relatively wide entry, hydraulic pressure is supplied to the extension cylinders 65 to extend the arm structure to move the cutter bar into the dotted line position indicated at C, thereby to enable swinging of the cutter bar in a relatively wide arc about the turntable axis.

In the illustrative embodiment of the invention shown in Figs. 14 to 23, inclusive, the truck frame, the truck propelling mechanism, the turntable supporting structure and the turntable rotation means are similar to those described above in the preferred illustrative embodiment of the invention. In this instance, however, the bearing annulus 8 of the truck frame has rotatably mounted thereon a horizontal turntable 110 similar to the turntable 2 and similarly having an upstanding segmental flange 111 formed with an arcuate guiding groove 79 with which the turntable rotating cables 76, 76 are engageable. This segmental open-center frame portion 111 supports at the sides thereof bearing hubs 112, and pivotally mounted on the turntable frame to swing in a vertical direction with respect to the turntable and extending through the open side of the flange portion 111 is a yoke-shaped frame portion 113 of a vertically swinging arm 114, and the arms 115 of this frame have integral bearing hubs 116 journaled on pins 117 secured within the bearing hubs 112 of the turntable frame. Arranged between the arms 115 of the yoke-shaped frame of the swinging arm 114 and secured to the arm is a motor 118, the motor being mounted to swing with the arm 114 between the sides of the segmental flanged portion 111 within the central opening of the turntable frame. The vertically swinging arm 114 is formed with a tubular forward portion 119 having telescopically arranged therein a tubular extension frame 120, the latter being splined at 121 against rotation relative to the tubular frame 119. Journaled within the forward portion of the extension frame 120 is a tubular frame 122 of a rotatable cutter head 123, the frame 122 being journaled within the tubular frame 120 in a bearing sleeve 124. Secured, as by welding, to the tubular frame 122 is an annular frame 125 having secured thereto a retaining ring 126 cooperating with an annular flange 127 formed integral with the forward extremity of the tubular frame 120. The cutter head 123 includes a yoke-shaped frame 128 secured to the forward extremity of the tubular frame 122. Pivotally mounted on the yoke-shaped frame of the rotatable cutter head 123 to swing relative thereto about an axis at right angles to the head axis is a cutter support 129, this swingable cutter support being pivotally mounted on the yoke-shaped frame at 130. Pivotally mounted on the swingable cutter support axis is an elongated plane cutter bar 131 having mounted for circulation about its margin an endless cutter chain 132. Secured to the cutter bar 131 and supporting the latter is a bar hanger 133 having an annular bearing portion 134 journaled on bearing sleeves 135 supported by an annular portion 136 of the swingable cutter support. The bearing portion of the bar hanger is retained in position on the support between an annular flange 137 formed on the support and a detachable retaining plate 138 secured to the support frame. It will thus be seen that the kerf cutter may swing with respect to the cutter support about an axis perpendicular to the support pivot axis. The means for locking the kerf cutter in its different angular positions with respect to the swingable support comprises a locking pin 139 slidably mounted in a bore in the bar hanger and insertible in any one of a number of locking openings 140 formed in lateral bosses 141 integral with the annular bearing portion 134 of the bar hanger. The pin is urged towards its locking position by a coiled spring 142, and a suitable cam lever means 143 is provided for moving the pin into its released position.

The motor 118 is arranged with its axis extending in coincidence with the longitudinal axis of the arm 114, and secured by a coupling 145 to the forward end of the motor power shaft is a shaft 146 splined at 147 to a telescopic tubular shaft 148. The rear end of the shaft 148 is journaled in a bearing 149 supported by a head 150 secured to the tubular extension frame 120 and the forward end of this shaft is connected by a coupling 151 to an alined shaft 152. The shaft 152 is journaled in bearings supported within the cutter head and has fixed thereto at its forward end a bevel gear 153, and this bevel gear drives, through a bevel idler gear similar to that disclosed in Fig. 24 of the above mentioned copending application, Ser. No. 20,826, a bevel gear 154 journaled on bearings supported by a shaft 155 in turn journaled within the swingable cutter support, and this bevel gear is connectible to the shaft 155 by a friction safety clutch 156 of the multiple disc type, so that when the clutch 156 slips, due to overload, the bevel gear may rotate with respect to the shaft 155. Keyed to the outer extremity of the shaft 155 is a chain sprocket 157 for engaging and driving the endless cutter chain 132. It will thus be seen that when the transmission connections between the motor and the cutter chain are so arranged with respect to the axes of the rotatable head and swingable cutter support, the cutter chain may be driven irrespective of the adjusted position of the parts.

Hydraulically operated means is employed for swinging the cutter support 129 about its pivot with respect to the yoke-shaped frame 128 of the rotatable cutter head, comprising a double acting hydraulic cylinder 160 pivotally mounted at its rear end at 161 on pivot pins supported by brackets formed integral with the annulus 125 of the rotatable head. Reciprocably mounted in the cylinder 160 is a piston 162 having its piston rod 163 extending forwardly through the packed front head 164 of the cylinder and pivotally connected by a pin 165 to the swingable cutter support 129, the pin 165 being mounted in projections 166 integral with the cutter support frame. The hydraulically operated mechanism for rotating the cutter head relative to the extensible arm structure comprises a pair of single acting hydraulic cylinders 170, 170 supported by a bracket 171 secured to the tubular extension frame 120 and each containing a reciprocable piston 172 having a rearwardly projecting piston rod 173. Each of these piston rods carries a bracket 174 on which is journaled a guide pulley 175. Passing around these pulleys are cables 176, 176 each anchored at one end at 177 to the cylinders, the cables passing from the pulleys 175 around inclined pulleys 178 journaled on brackets secured to the bracket 171, and the cables have their intermediate portions wrapped around a drum 179 formed integral with the annulus 125 of the rotatable cutter head, the opposite ends of these cables being firmly secured to the drum frame. Hydraulic means is provided for swinging the extensible arm structure in a vertical direction relative to the turntable, comprising a pair of double acting hydraulic cylinders 183, 183 mounted to swing in vertical planes and each containing, as shown in Fig. 15, a piston 184 having its piston rod 185 pivotally connected at 186 to projections 187 integral with the tubular frame 119 of the arm 114. It will thus be seen that when hydraulic pressure is supplied to the cylinders 183 the extensible arm structure may be swung upwardly and downwardly with respect to the turntable as desired. The hydraulic means for extending the extensible tubular frame 120 with respect to the tubular frame 119 of the swinging arm comprises a pair of double acting hydraulic cylinders 190, 190 secured within the arm frame and arranged in longitudinal paralled relation at opposite sides of the arm in the manner shown in Fig. 14. These cylinders each contain a piston 191 having a forwardly projecting piston rod 192 extending forwardly through the packed front head 193 of the cylinder, and the forward ends of these piston rods are pivotally connected at 194 within lugs integral with the bracket 171. It will thus be seen that when hydraulic pressure is supplied to the cylinders 190, the extension frame may be moved inwardly and outwardly with respect to the swinging arm as desired, thereby to vary the distance between the cutter bar pivot and the turntable axis.

Now referring to the hydraulic system and associated control means, a pump 87 is driven by the motor 85, and this pump is arranged in a tank 86, all in a manner clearly described, and the form of the invention above described, and a valve box 197 similar to the valve box 88 is similarly supported on the truck frame. This valve box 197 similarly has its supply passage connected through a conduit 89 to the pump intake and similarly has discharge passages connected through branched conduits 90, 90 and conduit 91 to the tank 86. The valve box 197 is connected by a conduit 198 to the forward end of the cutter support tilt cylinder 160, while the rear end of this tilt cylinder is connected by a conduit 199 to the valve box, and the flow of hydraulic pressure and the discharge from these conduits is controlled by a slide valve 200. The valve box is connected by a conduit 201 to one of the head rotating cylinders 170 and through a conduit 202 to the other head rotation cylinder 170, and the supply of liquid pressure to and the exhaust of pressure from these cylinders 170 is controlled by a slide valve 203. The valve box is connected by a conduit 204 to a branched conduit 205 connected to the rear ends of the arm swing cylinders 183, while a conduit 206 is connected by a branched conduit 207 to the forward ends of the cylinders 183, and the flow of liquid pressure to and the exhaust from these cylinders is controlled by a slide valve 208. The valve box is connected by a conduit 209 and a branched conduit 210 to the rear ends of the extension cylinders 190 and by a conduit 211 and a branched conduit 212 to the forward ends of the extension cylinders 190, and the supply of liquid pressure to and the exhaust from these conduits is controlled by a slide valve 213. The valve box is connected by a conduit 214 to the forward end of one of the turntable rotating cylinders 70 and through a conduit 215 to the forward end of the other turntable rotating cylinder 70, and the rear ends of these cylinders are connected through conduits 216 and 217 to the tank 86. The flow of liquid pressure to and the exhaust from conduits 214, 215 is controlled by a slide valve 218. It is accordingly evident that by adjusting the various slide valves hydraulic pressure may be supplied to the various hydraulic cylinders to effect turntable rotation, swinging of the arm structure, extension of the arm structure, rotation of the cutter head and swinging of the cutter support, and by trapping the liquid in the various cylinders the parts may be locked in their adjusted position.

The general mode of operation of this illustrative embodiment of the invention is as follows: The apparatus is propelled along the mine trackway through the mine entries at either a high or a low speed suitable respectively for transport and cutting, as clearly described in the above mentioned Joy application. When the working place is reached, the cutter head may be rotated to position the cutter bar in a shearing position, as shown in Fig. 20. The arm structure is then swung upwardly about its pivot relative to the turntable to position the tip end of the cutter bar at the mine roof. The apparatus is then propelled forwardly bodily along the mine trackway to sump the cutter bar into the coal seam. When the sumping cut is completed, hydraulic pressure is supplied to the arm swing cylinders 70 to swing the arm structure downwardly about its pivot to move the cutter bar in an arcuate path to cut a vertical kerf between the mine roof and mine floor. Upon completion of the swinging cut, the apparatus is propelled rearwardly bodily along the mine trackway to withdraw the cutter bar from the coal seam. When it is desired to insert a vertical shear cut in the rib at right angles to the trackway, hydraulic pressure is supplied to one of the turntable rotation cylinders 70 to swing the arm structure horizontally about the turntable axis to the right angle position shown in Figs. 21 and 22. Hydraulic pressure is then supplied to the arm swing cylinders 183 to swing the arm structure vertically about its pivot relative to the turntable to position the tip end of the cutter bar at the mine roof. Hydraulic pressure is then supplied to the extension cylinders 190 to extend the arm structure, and at the same time the arm structure is swung slightly downwardly, thereby to effect sumping movement of the cutter bar within the coal seam. Hydraulic pressure is then supplied to the arm swing cylinders 183 to swing the arm structure downwardly to move the kerf cutter vertically in its plane to cut a vertical kerf between the mine roof and mine floor. Hydraulic pressure is then supplied to the extension cylinders 190 to retract the arm structure and at the same time the arm structure is swung slightly downwardly about its pivot, thereby to withdraw the cutter bar from the coal. During operation of the apparatus in accordance with the arcwall method of cutting, as shown in Fig. 23, hydraulic pressure is supplied to one of the turntable rotation cylinders 70 to swing the cutter bar to the full line position shown in Fig. 23. The apparatus is then propelled bodily forwardly along the mine trackway to sump the cutter bar into the coal seam. Hydraulic pressure is then supplied to the other turntable rotation cylinder to swing the cutter bar transversely across the coal face, and thereafter the apparatus is propelled bodily rearwardly along the mine trackway to withdraw the cutter bar from the coal seam. The apparatus may operate in wide and narrow entries in a manner described above in regard to Figs. 11 and 12 of the other embodiment of the invention.

As a result of this invention, it will be noted that an improved mining apparatus is provided whereby sumping, swinging and withdrawal cuts may be inserted in the coal seam in accordance with the arcwall method of cutting while the apparatus remains stationary as regards movement along the mine trackway. It will further be noted that by the provision of the improved extensible arm structure, vertical shear cuts may be inserted in the coal face and in the ribs while the apparatus remains stationary as regards movement along the mine trackway. It will still further be evident that by the provision of the extensible arm structure, horizontal kerfs may be cut in the coal seam in accordance with the arcwall method of cutting in entries of varying width. These and other uses and advantages of the improved mining apparatus will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a mining apparatus, in combination, a portable base, an extensible and retractible arm structure mounted on said base, a kerf cutter pivotally mounted on the outer extremity of said arm structure to swing relative thereto and having orbitally movable cutting elements, and means for extending and retracting said arm structure and for swinging said kerf cutter about its pivot relative to said arm structure to move said kerf cutter to cut a plane kerf in a mine wall, said extending and retracting and swinging means comprising power operated devices common to both arm extension and kerf cutter swing and operatively connected to said arm structure and said kerf cutter.

2. In a mining apparatus, in combination, a portable base, an extensible and retractible arm structure mounted on said base, a kerf cutter pivotally mounted on the outer extremity of said arm structure to swing relative thereto and having orbitally movable cutting elements, and means for extending and retracting said arm structure and for swinging said kerf cutter about its pivot relative to said arm structure to move said kerf cutter to cut a plane kerf in the mine wall, said arm-structure-extending-and-retracting and kerf cutter swinging means comprising power operated devices common to both arm extension and kerf cutter swing and operatively connected to said arm structure and said kerf cutter, and means for effecting operation of said devices to effect simultaneous extension or retraction of said arm structure and swinging of said kerf cutter about its pivot relative to said arm structure.

3. In a mining apparatus, in combination, a portable base, a horizontal turntable mounted on said base for rotation relative thereto, a horizontal extensible and retractible arm structure mounted on said turntable and rigidly confined to horizontal swinging movement with said turntable about the turntable axis relative to said base, said arm structure extending forwardly in advance of said base, a kerf cutter pivotally mounted on the outer extremity of said arm structure to swing relative thereto and having orbitally movable cutting elements, and power operated devices common to both arm extension and kerf cutter swing and operatively connected to said arm structure and said kerf cutter for extending and retracting said arm structure and for swinging said kerf cutter about its pivot relative to said arm structure, to move said kerf cutter to cut a plane kerf in a mine wall.

4. In a mining apparatus, in combination, a portable base, a horizontal turntable mounted on said base for rotation relative thereto, a horizontal extensible and retractible arm structure mounted on said turntable and rigidly confined to horizontal swinging movement with said turntable about the turntable axis relative to said base, a kerf cutter pivotally mounted on the outer extremity of said arm structure to swing relative thereto and having orbitally movable cutting elements, power operated devices common to both arm extension and kerf cutter swing and operatively connected to said arm structure and said kerf cutter for extending and retracting said arm structure and for swinging said kerf cutter about its pivot relative to said arm structure, to move said kerf cutter to cut a plane kerf in a mine wall, and a power operated device for adjusting the elevation of said kerf cutter relative to said arm structure.

5. In a mining apparatus, in combination, a portable base, an extensible and retractible telescopic arm structure mounted on said base and comprising an axially extensible and retractible portion, a kerf cutter pivotally mounted on said axially extensible and retractible portion at the outer extremity of said arm structure to swing relative thereto and having orbitally movable cutting elements, and motor operated means operatively connected to said arm structure and kerf cutter and operable at a cutting speed for extending and retracting said arm structure to effect sumping and withdrawal movements of said kerf cutter and for swinging said kerf cutter about its pivot relative to said arm structure to effect swinging feeding movement of said kerf cutter, to cut a plane kerf in a mine wall.

6. In a mining apparatus, in combination, a portable base, a horizontal turntable mounted on said base for rotation relative thereto, an extensible and retractible arm mounted on said turntable and comprising an axially extensible and retractible portion, said arm extending forwardly in advance of said base, a kerf cutter pivotally mounted on said arm portion at the outer extremity of said arm to swing relative thereto and having orbitally movable cutting elements, means for rotating said turntable to swing said arm horizontally relative to said base, and means operatively connected to said arm and said kerf cutter for extending and retracting said portion of said arm and for swinging said kerf cutter about its pivot relative to said arm, to move said kerf cutter to cut a plane kerf in a mine wall, said arm-extending and kerf-cutter swinging means comprising power operated devices common to both arm extension and kerf cutter swing.

7. In a mining apparatus, in combination, a portable base, a horizontal turntable mounted on the forward end of said base for rotation relative thereto, an extensible and retractible arm mounted on said turntable and comprising an axially extensible and retractible portion, said arm extending forwardly in advance of said base, a kerf cutter pivotally mounted on said arm portion at the outer extremity of said arm to swing relative thereto and having orbitally movable cutting elements, means for rotating said turntable to swing said arm horizontally relative to said base, means operatively connected to said arm and said kerf cutter for extending and retracting said arm portion and for swinging said kerf cutter about its pivot relative to said arm, to move said kerf cutter to cut a plane kerf in a mine wall, said arm-extending and kerf-cutter-swinging means comprising power operated devices common to both arm extension and kerf cutter swing, and means for operating said power devices for effecting simultaneous extension or retraction of said arm and swinging of said kerf cutter about its pivot relative to said arm.

8. In a mining apparatus, in combination, a portable base, a horizontal turntable mounted on said base for rotation relative thereto, an extensible and retractible arm mounted on said turntable and comprising an axially extensible and retractible portion, a kerf cutter pivotally mounted on said arm portion at the outer extremity of said arm to swing relative thereto and having orbitally movable cutting elements, and power operated means including a pair of independently operable motors supported by said turntable and operatively connected to said arm and said kerf cutter, and means for simultaneously operating said motors for effecting axial extension or retraction of said arm and for independently operating said motors for effecting swinging of said kerf cutter in one direction or the other about its pivot relative to said arm, to move said kerf cutter to cut a plane kerf in a mine wall.

9. In a mining apparatus, in combination, an extensible and retractible arm comprising an axially extensible and retractible portion, a kerf cutter pivotally mounted on said arm portion at the outer extremity of said arm to swing relative thereto and having orbitally movable cutting elements, a pair of hydraulic rams operatively connected to said arm and said kerf cutter for extending and retracting said arm and for swinging said kerf cutter about its pivot, to effect feeding movement of said kerf cutter to cut a plane kerf in a mine wall, and means for effecting simultaneous operation of said rams for effecting axial extension and retraction of said arm and for independently operating said rams for effecting swinging of said kerf cutter in one direction or the other about its pivot relative to said arm.

10. In a mining apparatus, an extensible and retractible arm, a kerf cutter pivotally mounted on the outer extremity of said arm, a pair of hydraulic rams common to arm extension and retraction and kerf-cutter swing for extending and retracting said arm and for swinging said kerf cutter about its pivot relative to said arm, and a hydraulic ram carried at the outer extremity of said arm for adjusting the elevation of said kerf cutter.

11. In a mining apparatus, a horizontal extensible and retractible arm, a cutter support mounted on the outer extremity of said arm for rotation about a vertical axis, said cutter support having projections at the opposite sides thereof, a horizontal kerf cutter carried by said cutter support, and a pair of hydraulic rams mounted at the opposite sides of said arm and pivotally connected to said cutter support projections for extending and retracting said arm and for swinging said kerf cutter about its pivot relative to said arm.

12. In a mining apparatus, in combination, a portable base, a kerf cutter having orbitally movable kerf cutting elements, an adjustable supporting structure for said kerf cutter and extending between the latter and said base for supporting said kerf cutter for swinging and for translatory movement relative to said base, and fluid operated means common to both supporting structure adjustment and kerf cutter swing and operatively connected to said supporting structure and said kerf cutter for adjusting said supporting structure and swinging said kerf cutter, both at a cutting speed, to effect sumping, swinging and withdrawal movements of said kerf cutter relative to said base while the latter remains stationary, to cut a plane kerf in a mine wall.

13. In a mining apparatus, a portable base, an extensible and retractible arm structure pivotally mounted on said base to swing horizontally relative thereto and having an axially extensible and retractible portion, a horizontal kerf cutter pivotally mounted on said extensible and retractible portion at the outer extremity of said arm structure to swing horizontally relative thereto, and hydraulically operated means operatively connected to said extensible and retractible portion and said kerf cutter for extending and retracting said arm structure and for swinging said kerf cutter horizontally about its pivot relative to said arm structure to move said kerf cutter horizontally to cut a horizontal plane kerf in a mine wall, said means including, in common, hydraulic power cylinders mounted on said arm structure and containing pistons operatively connected to said kerf cutter for extending and retracting said arm structure and for swinging said kerf cutter about its pivot.

14. In a mining apparatus, a portable base, a horizontal kerf cutter, and means for moving said kerf cutter horizontally relative to said base to cut a horizontal plane kerf in a mine wall comprising an extensible arm pivotally mounted on said base to swing horizontally relative thereto and on the outer extremity of which said kerf cutter is pivotally mounted to swing horizontally relative thereto, and hydraulically operated means for swinging said arm and kerf cutter about their respective pivots and for extending and retracting said arm, said arm extending and retracting means and said kerf cutter swinging means comprising, in common, a pair of hydraulic cylinders mounted on said arm and containing reciprocable pistons operatively connected to said kerf cutter and means for effecting simultaneous operation of said cylinders at relatively different rates to effect simultaneous extension of said arm and swinging of said kerf cutter about its pivot.

CHARLES F. OSGOOD.

CERTIFICATE OF CORRECTION.

Patent No. 2,131,189. September 27, 1938.

CHARLES F. OSGOOD.

It is hereby certified that error appears in the printed specification of the above numbered patent requiring correction as follows: Page 1, first column, line 39, for the words "at the coal face and at" read in the coal face and in; and that the said Letters Patent should be read with this correction therein that the same may conform to the record of the case in the Patent Office.

Signed and sealed this 22nd day of November, A. D. 1938.

Henry Van Arsdale (Seal) Acting Commissioner of Patents.